United States Patent
Nakamura et al.

(10) Patent No.: US 8,567,593 B2
(45) Date of Patent: Oct. 29, 2013

(54) BELT PROFILE AND PROFILED BELT

(75) Inventors: Haruhiko Nakamura, Nara (JP); Ryuki Inoue, Nara (JP)

(73) Assignee: The Gates Corporation, Denver, CO (US)

( * ) Notice: Subject to any disclaimer, the term of this patent is extended or adjusted under 35 U.S.C. 154(b) by 362 days.

(21) Appl. No.: 12/741,649

(22) PCT Filed: Jul. 30, 2008

(86) PCT No.: PCT/JP2008/063683
§ 371 (c)(1),
(2), (4) Date: May 6, 2010

(87) PCT Pub. No.: WO2009/060646
PCT Pub. Date: May 14, 2009

(65) Prior Publication Data
US 2010/0236898 A1    Sep. 23, 2010

(30) Foreign Application Priority Data
Nov. 8, 2007  (JP) .................................. 2007-290491

(51) Int. Cl.
*B65G 15/42* (2006.01)
*B65G 17/12* (2006.01)

(52) U.S. Cl.
USPC ..................................................... 198/699.1

(58) Field of Classification Search
None
See application file for complete search history.

(56) References Cited

U.S. PATENT DOCUMENTS 6,695,135 B1 *   2/2004   Lapeyre ........................ 198/853

FOREIGN PATENT DOCUMENTS

| DE | 9017386 U1 | | 3/1991 |
|---|---|---|---|
| DE | 29605872 U1 | | 7/1996 |
| GB | 2173757 A | * | 10/1986 |
| JP | 58-6803 A | | 1/1983 |
| JP | 2004-59271 A | | 2/2004 |
| JP | 2004-59272 A | | 2/2004 |
| JP | 2004059271 A | * | 2/2004 |
| JP | 2005-145568 A | | 6/2005 |
| JP | 2007-197149 A | | 8/2007 |

* cited by examiner

*Primary Examiner* — Kavel Singh
(74) *Attorney, Agent, or Firm* — Paul N. Dunlap, Esq.; Jeffrey A. Thurnau, Esq.

(57) ABSTRACT

This invention provides a belt profile and profiled belt that can be easily mounted to and detached from a toothed belt. Specifically, a profile body and a claw section are integrally formed via a connection section. A side edge section of the toothed belt is inserted between the profile body and the claw section from an inner side in the belt width direction. The profile body is arranged on a rear surface side of the toothed belt. The claw section is arranged at the side edge section, on the tooth surface side. The connection section passes outside the side surface of the toothed belt. The profile is mounted on the toothed belt by engaging the claw section with a belt tooth while the profile body and the claw section sandwich the side edge section. The profile is removed from the toothed belt by performing these procedures in reverse order.

19 Claims, 10 Drawing Sheets

BELT PROFILE AND PROFILED BELT

CROSS-REFERENCE TO RELATED APPLICATIONS

The present application claims the priority of International Application PCT/JP2008/063683 filed on Jul. 30, 2008, which claims the benefit of Japanese Patent Application No. 2007-290491 filed on Nov. 8, 2007, both of which are hereby incorporated herein by reference in their entirety.

BACKGROUND OF THE INVENTION

1. Technical Field

The present invention relates to a belt profile that is mounted on a toothed belt for use and a thus profiled belt.

2. Background Art

In general, in belt conveying, when a conveyed object is one that is liable to roll, or when the object is inclined at a large angle in the conveying direction with respect to the horizontal plane, a profile for press feeding the conveyed object in the conveying direction is attached to the rear surface of the belt. In many cases, the profile is attached to the rear surface of the belt by welding or bonding with an adhesive, and in some cases the belt and profiles are integrally molded.

However, when welding or bonding with an adhesive or the like is employed as a method for attaching a profile to a belt, the selection of the material of the profile is liable to be restricted. Furthermore, since the profile cannot be detached, the state of the joint cannot be checked by observing only the outer appearance, and it is therefore difficult in many cases to judge the lifespan of the profile. Further, to integrally mold a belt and profiles it is necessary to use a die in which the shape of the profiles is engraved into a belt mold, and consequently the amount of investment increases and it is also difficult to deal with dimensional changes.

Regarding the above described circumstances, for example, Patent Document 1 discloses a structure in which a profile is attached to a toothed belt by screwing the profile via a generally C-shaped fixture or a pair of L-shaped fixtures that protrude to the rear surface side at a side surface of the toothed belt, in a state in which the profile is fitted into a tooth bottom of the toothed belt.

Patent Document 1: Japanese Patent Laid-Open No. 2004-59272 (paragraph number 0006 to 0009)

However, because the profile disclosed in Patent Document 1 is attached to the toothed belt by screwing, mounting and detachment thereof is troublesome, and once the profile has been mounted to the toothed belt, the profile is liable to remain mounted thereto without the user detaching the profile from the toothed belt to check the lifespan thereof or the like.

BRIEF SUMMARY OF THE INVENTION

An object of the present invention is to provide a belt profile and a profiled belt that are easily attached to and detached from a toothed belt.

To achieve the above described object, according to the present invention there is provided a belt profile that is mounted on a toothed belt for use, comprising: a profile body arranged on a rear surface side of the toothed belt; and a claw section arranged at a side edge section on a tooth surface side of the toothed belt so as to engage with a belt tooth while sandwiching the side edge section of the toothed belt between the claw section and the profile body; characterized in that the claw section is integrally formed with the profile body via a connection section that passes outside of a side surface of the toothed belt.

According to the above configuration, since the profile body and the claw section are integrally formed via a connection section that passes outside of a side surface of the toothed belt, the profile can be easily mounted to the toothed belt by merely inserting the side edge section of the toothed belt between the profile body and the claw section from an inner side in the belt width direction. Further, the profile can be easily detached from the toothed belt by performing the procedures for mounting the profile in the reverse order. In this connection, to insert the side edge section of the toothed belt between the profile body and the claw section or to extract the side edge section of the toothed belt therefrom, the tip of the claw section may be made to stride over the side edge section of the toothed belt by curving the toothed belt to temporarily narrow the toothed belt in the belt width direction.

Further, since the claw section is arranged at a side edge section on a tooth surface side of the toothed belt, the claw section can be positioned on an outer side of a toothed pulley in a belt width direction while engaging with a belt tooth to inhibit movement of the profile in the lengthwise direction of the belt, and thus prevent obstruction to meshing between the toothed belt and the toothed pulley.

The claw section may be any shape that can engage with a belt tooth at a side edge section of the toothed belt, and can be provided in a shape that fits with a plurality of tooth tips and tooth grooves. As the length of the claw section in the longitudinal direction of the belt decreases, the harder it is for bending of the toothed belt to be inhibited by the claw section, and a toothed pulley on which the toothed belt is wound can be provided with a small diameter.

As the sectional shape of the claw section, a sectional shape can be exemplified that fits in a single tooth groove without covering a tooth tip of the toothed belt. It is thereby possible to form the claw section in a simple angular shape, and also shorten the length of the claw section in the longitudinal direction of the belt as much as possible. Further, by providing the claw section in a sectional shape that fits in a single tooth groove of the toothed belt and also covers tooth tips on both sides of the tooth groove, in comparison to a shape that only fits into a single tooth groove, the strength of the claw section can be increased by an amount proportional to the length of the claw section in the longitudinal direction of the belt, that is, by an amount by which the width of the claw section is greater.

The claw section can also be provided in a sectional shape that covers a single tooth tip without fitting in a tooth groove of the toothed belt. By adopting this shape, since the claw section can engage with a tooth tip portion which is an area of the toothed belt that is originally difficult to bend, it is possible to make it more difficult to inhibit flexure of the toothed belt without inhibiting bending of a tooth groove portion that is an area of the toothed belt that is easy to bend.

In the case of providing the claw section with a narrow width so as not to inhibit flexure of the toothed belt as described above, if the length of the claw section in the longitudinal direction of the belt is merely shortened, the profile is liable to fall over due to a reaction force from a conveyed object. However, by adopting a configuration in which the profile body includes a protruding piece provided in a protruding manner on a substrate that comes in contact with a rear surface of a toothed belt, and providing the substrate with a length that extends over a plurality of tooth tips and tooth grooves of the toothed belt, the profile can be prevented from collapsing without inhibiting flexure of the toothed belt.

That is, at a position at which the toothed belt that is suspended between pulleys is stretched in a straight line, the profile can be prevented from collapsing by the entire substrate of the profile body contacting with the toothed belt. Meanwhile, at a position at which the toothed belt is wound over a toothed pulley, the substrate of the profile body does not inhibit flexure of the toothed belt since the substrate floats up so as to make line contact with the toothed belt.

Further, if the substrate is provided in an extending manner further rearward than the claw section in a rotational direction of the toothed belt, collapsing of the profile can be effectively prevented when the toothed belt is rotated in one direction. Furthermore, if the substrate is provided in an extending manner to the front and rear of the claw section in a rotational direction of the toothed belt, collapsing of the profile can also be prevented when the toothed belt is rotated in two directions.

A configuration can also be adopted in which the profile body includes a protruding piece provided in a protruding manner on a substrate that comes in contact with a rear surface of the toothed belt, in which the protruding piece is provided as an attachment that is detachable from the substrate. By adopting this configuration, it is possible to make the claw section and the substrate common for profiles of various shapes, and moreover, profiles of various shapes can be mounted by merely exchanging a protruding piece while the substrate of the profile remains mounted to the toothed belt.

The present invention further provides a profiled belt that has belt teeth that mesh with pulley teeth of a toothed pulley, and on which a profile is mounted, characterized in that: a belt width thereof is set to a width that is wider than a length in a central axial direction of the toothed pulley; and a side edge section that protrudes in a belt width direction from the toothed pulley is sandwiched between a profile body that is arranged on a rear surface side and a claw section that is integrally formed with the profile body and is positioned on a tooth surface side and engaged with a belt tooth.

According to this configuration, similarly to the above described belt profile, it is possible to facilitate attachment and detachment of the profile to and from the toothed belt and also prevent obstruction of meshing between the toothed belt and toothed pulley while preventing movement of the profile in the longitudinal direction of the belt. In particular, by employing the above described belt profile as the profile of a profiled belt, it is possible to obtain the same advantages as those obtained by employing the configuration of the belt profile described above.

Further, by causing the claw section of the profile to face an outer end surface of the toothed pulley or a positioning material to restrict positional deviations in the belt width direction, a dedicated pulley flange or the like for restricting positional deviations of the toothed belt can be omitted.

As described above, according to the present invention, since a profile body and a claw section are integrally formed, the profile can be easily attached to or detached from the toothed belt by merely inserting the side edge section of the toothed belt between the profile body and the claw section or by extracting the side edge section therefrom. It is thereby possible to detach the profile at any time to observe the outer appearance thereof, and thereby easily judge the lifespan of the profile or the like.

DESCRIPTION OF SYMBOLS

1 Profile
3 Toothed belt
3a Side edge section
4 Profile body
5 Belt tooth
6, 18, 19 Claw section
7 Connection section
8 Toothed pulley
10, 21 Substrate
11, 20 Protruding piece
12 Tooth tip
13 Tooth groove
17 Positioning material

DETAILED DESCRIPTION OF THE INVENTION

Figure 1:
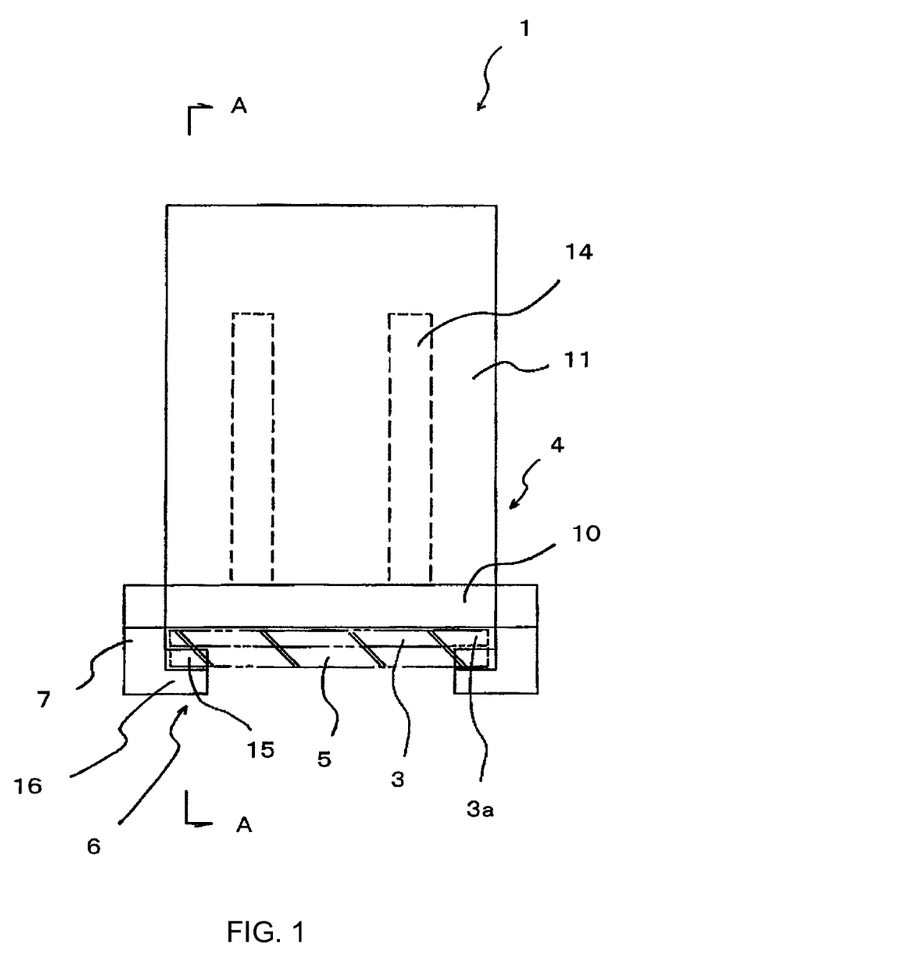
FIG. 1 is a front view of a belt profile according to the present invention.
Figure 2:
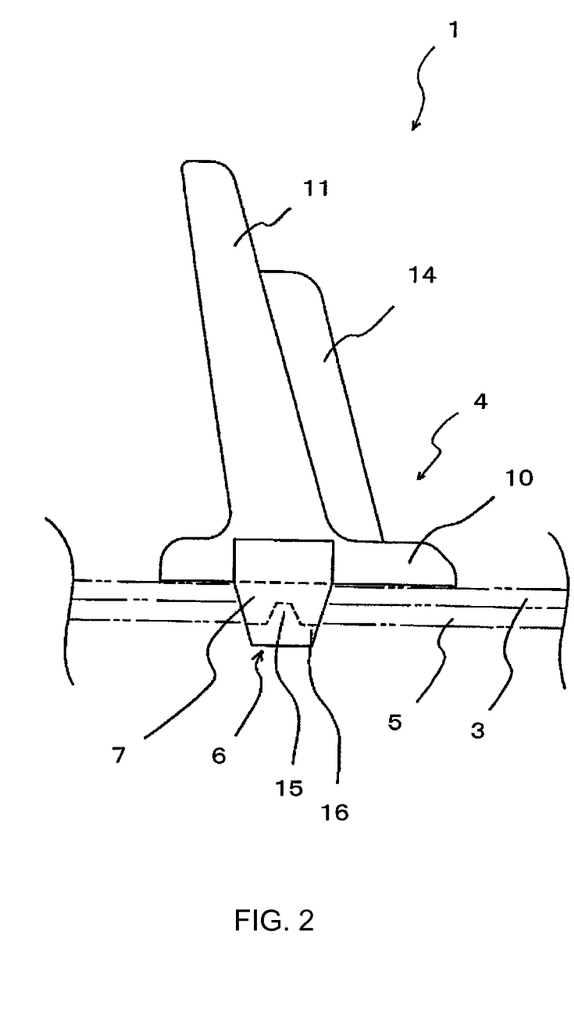
FIG. 2 is a side surface view of the profile.
Figure 3:
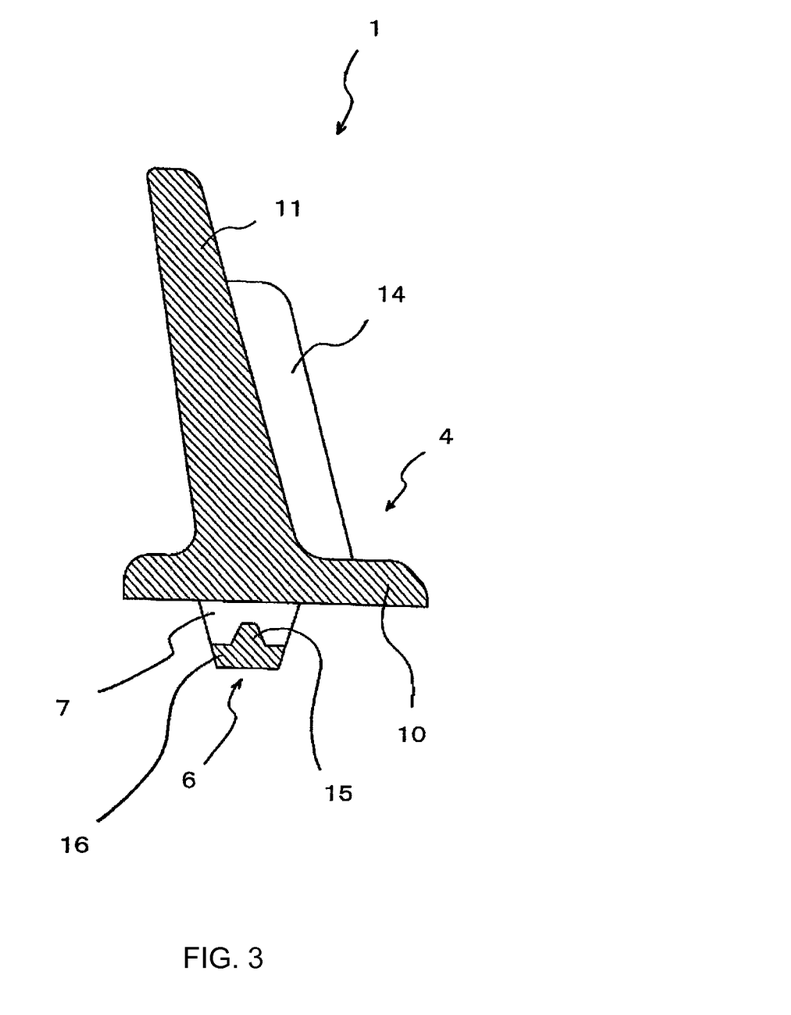
FIG. 3 is a sectional view taken along line A-A in FIG. 1.
Figure 4:
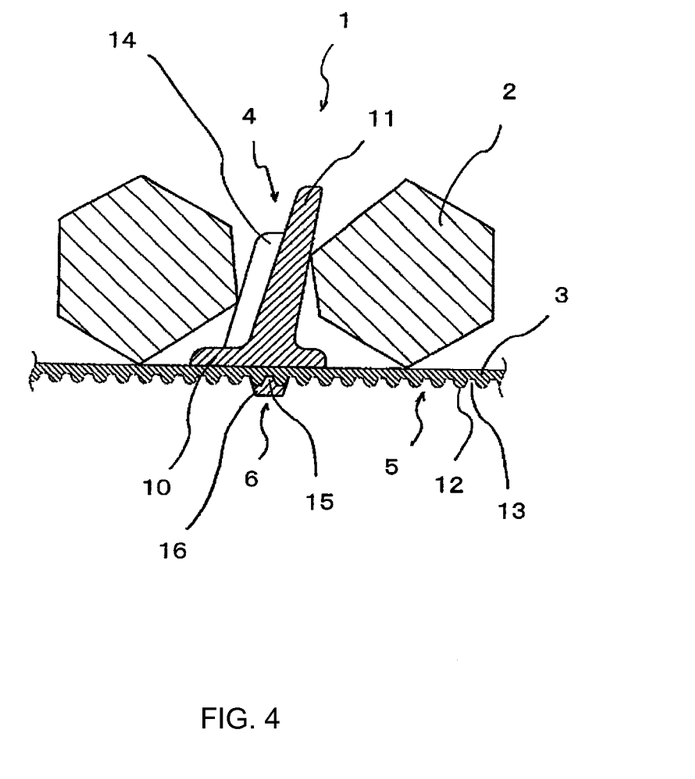
FIG. 4 is a sectional view of a profile mounted on a toothed belt.

An embodiment implementing a belt profile and a profiled belt according to the present invention is described below with reference to the drawings. FIG. 1 is a front view of a belt profile according to the present invention. FIG. 2 is a side surface view of the profile. FIG. 3 is a sectional view taken along line A-A in FIG. 1. FIG. 4 is a sectional view of a profile mounted on a toothed belt.

For example, a desired number of profiles 1 are mounted on a toothed belt 3 and used to enable a conveyed object 2 that is liable to roll to be conveyed on the belt in a direction that is inclined with respect to a horizontal plane. The profile 1 includes a profile body 4 arranged on a rear surface side of the toothed belt 3, a claw section 6 that engages with belt teeth 5 while sandwiching a side edge section 3a of the toothed belt 3 between the claw section 6 and the profile body 4, and a connection section 7 that passes outside of the side surface of the toothed belt 3. The profile body 4 and the claw section 6 are integrally formed through the connection section 7. The profile 1 is, for example, formed from a synthetic resin such as nylon or polypropylene.

The toothed belt 3 has belt teeth 5 that mesh with pulley teeth 9 of a toothed pulley 8, and the belt width thereof is designed to be wider than a length in a central axial direction of the toothed pulley 8. As a result, the side edge section 3a of the toothed belt 3 that is wound over the toothed pulley 8 is sandwiched between the profile body 4 and the claw section 6 and projects in the belt width direction from the toothed pulley 8, and prevents meshing between the toothed belt 3 and the toothed pulley 8 from being obstructed by the claw section 6.

The profile body 4 is formed to have a cross section that is in a substantially inverted T shape, and includes an oblong substrate 10 that is arranged so as to contact the rear surface of the toothed belt 3, and a protruding piece 11 provided in a protruding manner on one surface of the substrate 10. The protruding piece 11 is configured so as to press feed the conveyed object 2 in the conveying direction.

The substrate 10 is designed to have approximately the same width as the width of the toothed belt 3, and is provided in an extending manner to the front and rear of the claw section 6 in the longitudinal direction of the toothed belt 3 so as to extend over a plurality of tooth tips 12 and tooth grooves 13 of the toothed belt 3. The protruding piece 11 is formed in an oblong shape that is the same width as the substrate 10 and becomes thicker relative to the proximity thereof to the base end side. The rear surface side thereof is reinforced with two ribs 14.

The claw section 6 includes an angular section 15 with a trapezoidal cross section that fits into a tooth groove 13 of the side edge section 3a of the toothed belt 3, and a plate-shaped cover section 16 that covers tooth tips 12 of the side edge section 3a of the toothed belt 3. By arranging the claw section 6 on a tooth surface side of the toothed belt 3, the claw section 6 fits into the tooth groove 13 of the toothed belt 3 while sandwiching the side edge section 3a between the claw section 6 and the profile body 4, and covers the tooth tips 12 on both sides thereof to engage with the belt teeth 5.

The connection section 7 is made in a substantially trapezoidal plate shape, and is formed so as to protrude from a center part in the longitudinal direction of the belt to the belt tooth surface side among the two side surfaces of the substrate 10. The claw section 6 is formed to protrude inward in the belt width direction from the tip thereof.

Figure 5:
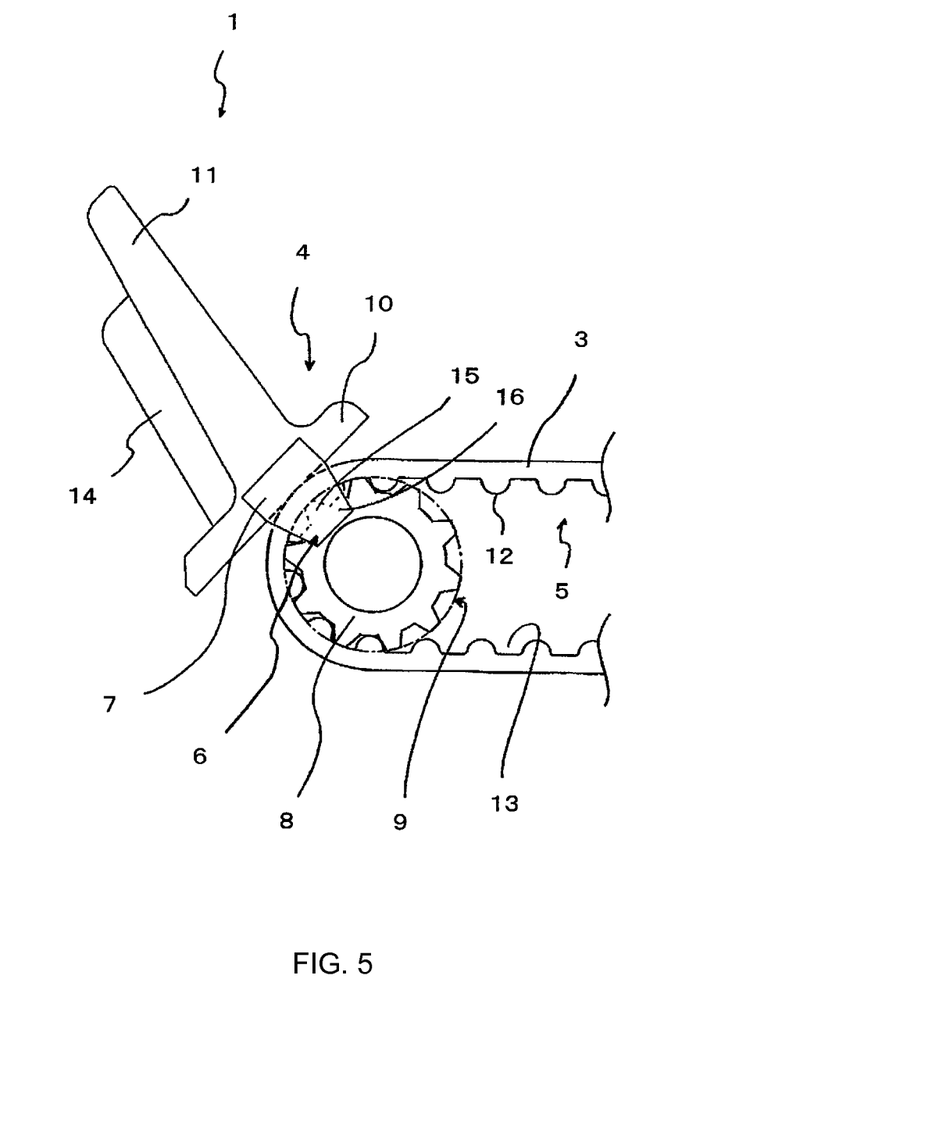
FIG. 5 is a side surface view of a profile that is positioned on an outer circumference side of a toothed pulley.

Next, a state when the toothed belt on which the profile is mounted is rotated is described. FIG. 5 is a side surface view of a profile that is positioned on an outer circumference side of the toothed pulley.

First, the profile 1 is mounted on the toothed belt 3 by sandwiching the side edge section 3a of the toothed belt 3 between the substrate 10 of the profile body 4 and the claw section 6, and fitting the angular section 15 of the claw section 6 in the tooth groove 13 of the side edge section 3a. In this case, in order to sandwich the side edge section 3a of the toothed belt 3, the toothed belt 3 is curved to narrow the toothed belt 3 in the belt width direction and thereby allow the tip of the claw section 6 to stride over the toothed belt 3 so that the side edge section 3a is inserted between the substrate 10 and the claw section 6 while fitting the angular section 15 of the claw section 6 in the tooth groove 13. The profile 1 can be detached from the toothed belt 3 by performing the above procedures in the reverse order.

When the toothed belt 3 is rotated forward to move to the front side (right direction in FIG. 4), the conveyed object 2 on the front side is press-fed in the direction of the front side by the profile 1. The profile 1 conveys a reaction force received from the conveyed object 2 at this time to the toothed belt 3 via the tooth groove 13 from the claw section 6.

As shown in FIG. 4, when the profile 1 is located at a position on the toothed belt 3 stretched between the toothed pulleys 8, the whole of the substrate 10 contacts with the rear surface of the toothed belt 3. In this state, the profile 1 is prevented from collapsing under the reaction force received from the conveyed object 2 on the front side by an area provided in an extending manner on the rear surface side of the substrate 10 coming into pressure contact with the rear surface of the belt.

When the toothed belt 3 is rotated in the reverse direction and the profile 1 is moved to the rear surface side (left direction in FIG. 4) to press feed the conveyed object 2 on the rear surface side in the direction of the rear surface side, collapsing of the profile 1 under the reaction force received from the conveyed object 2 on the rear surface side is prevented by an area provided in an extending manner on the front side of the substrate 10 coming into pressure contact with the rear surface of the belt.

Further, as shown in FIG. 5, when the profile 1 is positioned at an outer circumference side of the toothed pulley 8, the substrate 10 floats up from the rear surface of the toothed belt 3 while keeping the vicinity of the claw section 6 in contact with the rear surface of the toothed belt 3. Therefore, the toothed pulley 8 can be provided with a small diameter without the substrate 10 inhibiting bending of the toothed belt 3.

According to the above described configuration, since the profile 1 can be easily attached to and detached from the toothed belt 3, the lifespan of the profile 1 can be judged by detaching the profile 1 at any time to observe the profile 1. Further, since the profile 1 is attached by sandwiching the side edge section 3a of the toothed belt 3, the material of the toothed belt 3 and the profile 1 can be freely selected. Furthermore, since the substrate 10 of the profile 1 is capable of contacting with and rising up from the rear surface of the toothed belt 3, the profile 1 can withstand a large reaction force from the conveyed object 2 while at the same time the toothed pulley 8 can be provided with a small diameter.

Figure 6:
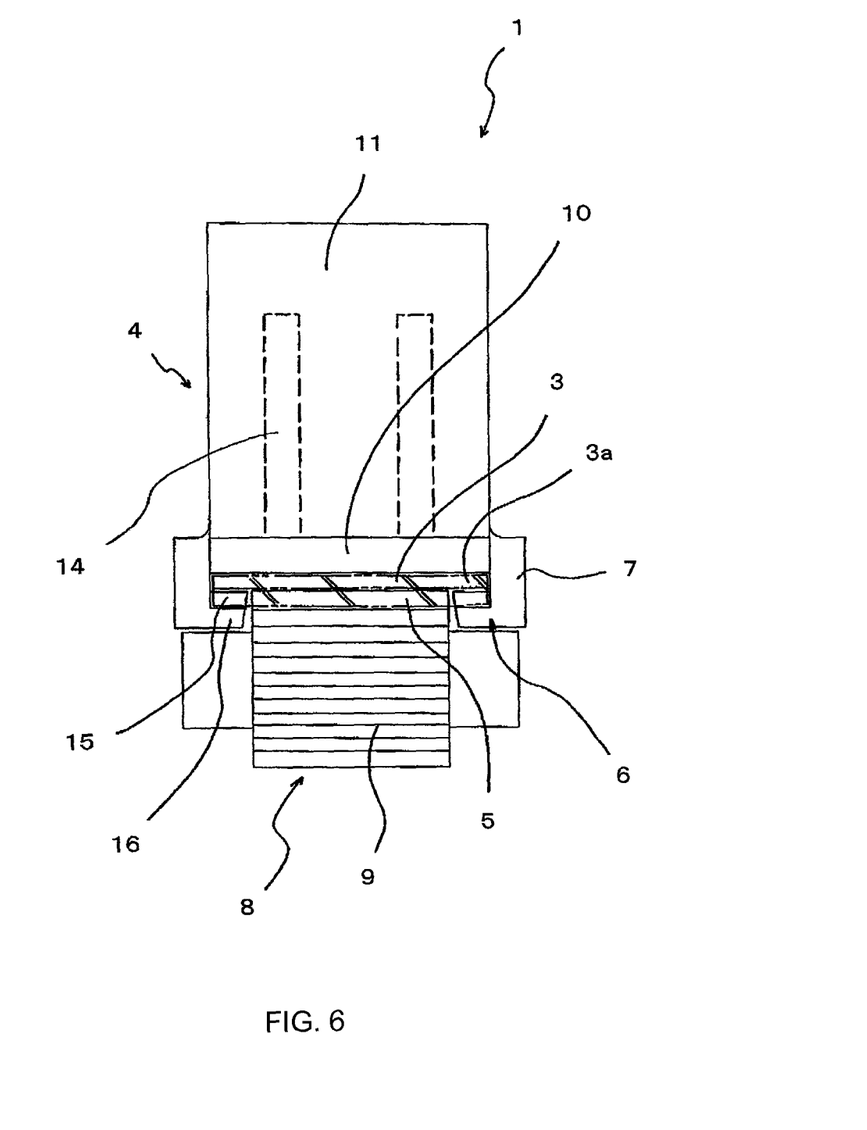
FIG. 6 is a front view of a profile whose claw section faces an outer end surface of the toothed pulley.
Figure 7:
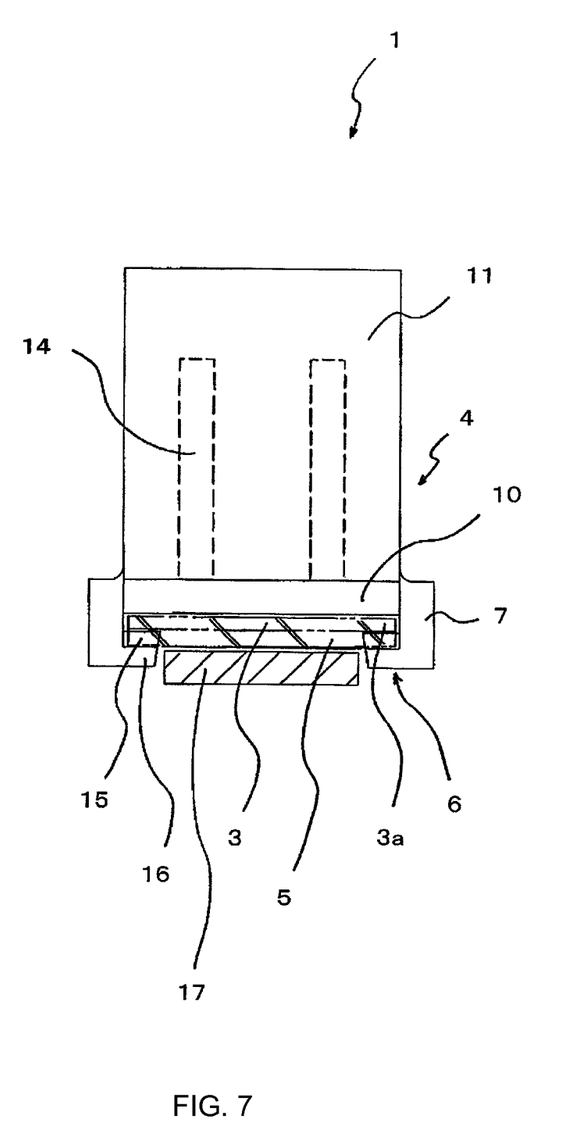
FIG. 7 is a front view of a profile whose claw section faces an outer end surface of a positioning material.

The present invention is not limited to the above described embodiment, and can be suitably changed within the scope of the present invention. For example, as shown in FIG. 6, a positional deviation in a belt width direction of the toothed belt 3 may be restricted by forming the tip of the claw section 6 in a taper shape and guiding the claw section 6 so as to face an outer end surface of the toothed pulley 8. As a result, a dedicated member such as a pulley flange that prevents a positional deviation of the toothed belt 3 can be omitted. Further, as shown in FIG. 7, a positional deviation of the toothed belt 3 in a belt width direction can also be restricted by providing a positioning material 17 at a position that is further on a tooth surface side than the toothed belt 3, and causing the claw section 6 to face an end surface of the positioning material 17.

Figure 8:
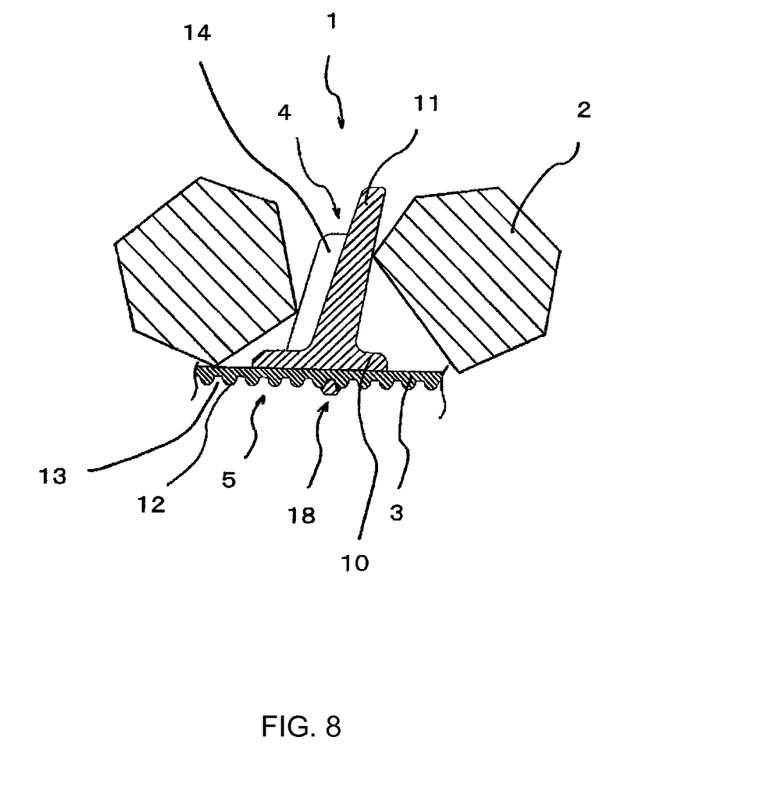
FIG. 8 is a sectional view of a profile including a claw section comprising only an angular section that fits in a tooth groove.

Furthermore, as shown in FIG. 8, instead of the claw section 6 that includes the angular section 15 and the cover section 16, a claw section 18 can be employed that includes only an angular section that fits into a single tooth groove 13 without covering the tooth tip 12 of the toothed belt 3. As a result, even though the strength of the claw section 18 is reduced, a configuration can be adopted that minimizes any hindrance to bending of the toothed belt 3.

Figure 9:
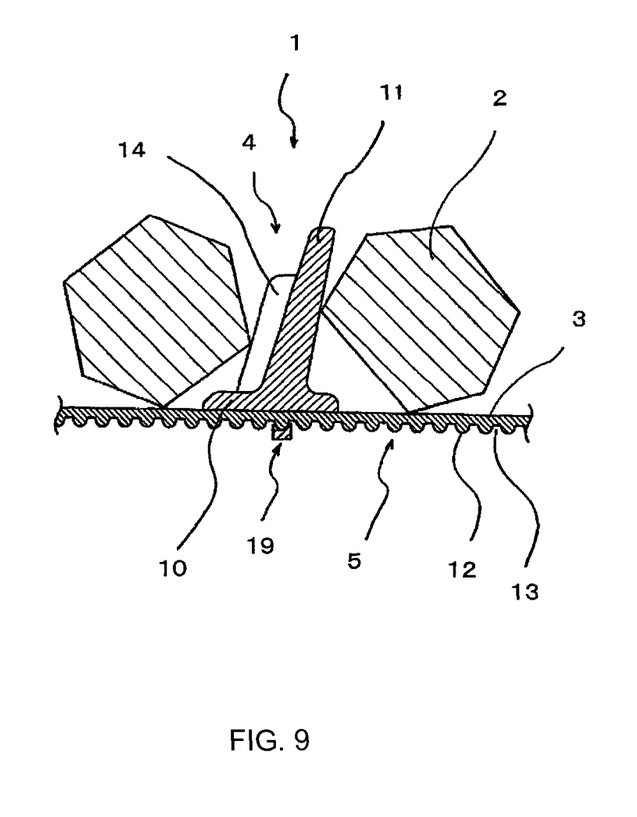
FIG. 9 is a sectional view of a profile including a claw section that engages with a tooth tip.

Further, as shown in FIG. 9, a claw section 19 with a concave sectional shape can be employed that covers a single tooth tip 12 without fitting in the tooth groove 13 of the toothed belt 3. In this case, since the claw section 19 is engaged in the tooth tip 12 that is an area that is originally difficult to bend in the toothed belt 3, hindrance to flexure of the toothed belt 3 can be minimized without hindering bending of the tooth groove 13 that is an area that is easy to bend.

Figure 10:
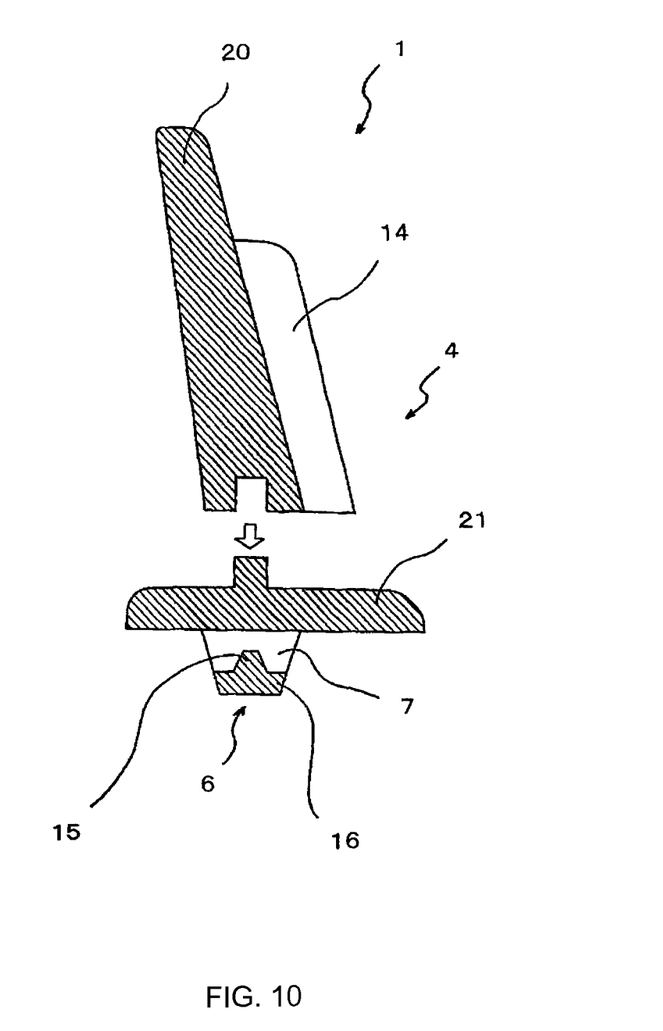
FIG. 10 is a sectional view of a profile including a protruding piece as an attachment.

As shown in FIG. 10, a configuration can also be adopted in which the substrate 10 and the protruding piece 11 are not integrally formed, and instead a protruding piece 20 is provided as a detachable attachment on a substrate 21. As a result, the substrate 21, the claw section 6, and the connection section 7 can be used as common members, and only the protruding piece 20 can be exchanged with other protruding pieces 20 of various shapes according to a purpose.

Further, in a case in which the toothed belt 3 rotates in one direction only, the substrate 10 can be provided not only in an extending manner to the front and rear of the claw section 6, but can also be provided to extend only further rearward than the claw section 6 in the rotational direction of the toothed belt 3.

According to a belt profile and a profiled belt of the present invention, it is possible to easily judge the lifespan of a profile for press feeding a conveyed object in a conveying direction while the profile is attached to the rear surface of a belt. Hence, the belt profile and profiled belt can be favorably employed for belt conveying in the case of conveying an object that is liable to roll or a case in which there is a large angle of inclination in a conveying direction with respect to a horizontal plane.

What is claimed is:

1. A belt profile that is mounted for use on a toothed belt, comprising:
   a profile body arranged on a rear surface side of the toothed belt; and
   a claw section arranged at a side edge section on a tooth surface side of the toothed belt so as to engage with a belt tooth while sandwiching a side edge section of the toothed belt between the claw section and the profile body;
   characterized in that:
   the profile body comprises a substrate and a protruding piece provided in a protruding manner on the substrate, and the substrate comes in contact with a rear surface of the toothed belt;
   the substrate is set to a length that extends over a plurality of tooth tips and tooth grooves of the toothed belt so as to prevent collapse of the profile body and withstand a reaction force received from a conveyed object; and
   the claw section is formed integrally with the profile body via a connection section that passes around the outside of a side surface of the toothed belt so as to enable insertion or extraction of the side edge section between the claw section and the substrate from an inner side in a belt width direction by curving the toothed belt to narrow the toothed belt in the belt width direction.

2. The belt profile according to claim 1, characterized in that the claw section is provided in a sectional shape that fits in a single tooth groove without covering a tooth tip of the toothed belt.

3. The belt profile according to claim 1, characterized in that the claw section is provided in a sectional shape that fits in a single tooth groove of the toothed belt and also covers a tooth tip on both sides of the tooth groove.

4. The belt profile according to claim 1, characterized in that the claw section is provided in a sectional shape that covers a single tooth tip without fitting in a tooth groove of the toothed belt.

5. The belt profile according to claim 1 characterized in that the substrate extends further rearward than the claw section or further to the front and rear of the claw section in a rotational direction of the toothed belt.

6. The belt profile according to claim 1, characterized in that the profile body comprises a protruding piece provided in a protruding manner on a substrate that comes in contact with a rear surface of the toothed belt, and the protruding piece is provided as an attachment that is detachable from the substrate.

7. A profiled belt that has belt teeth that mesh with pulley teeth of a toothed pulley, and on which a profile is mounted, characterized in that:
   a belt width thereof is set to a width that is wider than a length in a central axial direction of the toothed pulley;
   the profile comprises a profile body comprising a substrate and a protruding piece provided in a protruding manner on the substrate, and the substrate comes in contact with a rear surface side of a toothed belt, and a claw section that is integrally formed with the profile body and is positioned on a tooth surface side of a toothed belt and engaged with a belt tooth;
   the substrate is set to a length that extends over a plurality of tooth tips and tooth grooves of the toothed belt so as to prevent collapse of the profile body and withstand a reaction force received from a conveyed object; and
   by curving the profiled belt in a belt width direction to narrow the profiled belt, a side edge section that protrudes in the belt width direction from the toothed pulley is inserted between the claw section and the substrate from an inner side in the belt width direction and sandwiched therebetween.

8. The profiled belt according to claim 7, characterized in that the claw section of the profile faces an outer end surface of the toothed pulley or a positioning material and restricts a positional deviation of the profile in a belt width direction.

9. The profiled belt according to claim 7, characterized in that the claw section is provided in a sectional shape that fits in a single tooth groove without covering a tooth tip of the toothed belt.

10. The profiled belt according to claim 7, characterized in that the claw section is provided in a sectional shape that fits in a single tooth groove of the toothed belt and also covers a tooth tip on both sides of the tooth groove.

11. The profiled belt according to claim 7, characterized in that the claw section is provided in a sectional shape that covers a single tooth tip without fitting in a tooth groove of the toothed belt.

12. The profiled belt according to claim 7 characterized in that the substrate extends further rearward than the claw section or further to the front and rear of the claw section in a rotational direction of the toothed belt.

13. The profiled belt according to claim 7, characterized in that the profile body comprises a protruding piece provided in a protruding manner on a substrate that comes in contact with a rear surface of the toothed belt, and the protruding piece is provided as an attachment that is detachable from the substrate.

14. The profiled belt according to claim 8, wherein the claw section is provided in a sectional shape selected from a shape that fits in a single tooth groove without covering a tooth tip of the toothed belt, a shape that fits in a single tooth groove of the toothed belt and also covers a tooth tip on both sides of the tooth groove, and a shape that covers a single tooth tip without fitting in a tooth groove of the toothed belt.

15. The profiled belt according to claim 14, wherein the substrate extends further rearward than the claw section or further to the front and rear of the claw section in a rotational direction of the toothed belt.

16. The profiled belt according to claim 15, wherein the profile body comprises a protruding piece provided in a protruding manner on a substrate that comes in contact with a rear surface of the toothed belt, and the protruding piece is provided as an attachment that is detachable from the substrate.

17. The belt profile according to claim 1, wherein the claw section is provided in a sectional shape selected from a shape that fits in a single tooth groove without covering a tooth tip of the toothed belt, a shape that fits in a single tooth groove of the toothed belt and also covers a tooth tip on both sides of the tooth groove, and a shape that covers a single tooth tip without fitting in a tooth groove of the toothed belt.

18. The belt profile according to claim 17, wherein the substrate extends further rearward than the claw section or further to the front and rear of the claw section in a rotational direction of the toothed belt.

19. The belt profile according to claim 18, wherein the profile body comprises a protruding piece provided in a protruding manner on a substrate that comes in contact with a rear surface of the toothed belt, and the protruding piece is provided as an attachment that is detachable from the substrate.

* * * * *